Figure 1:
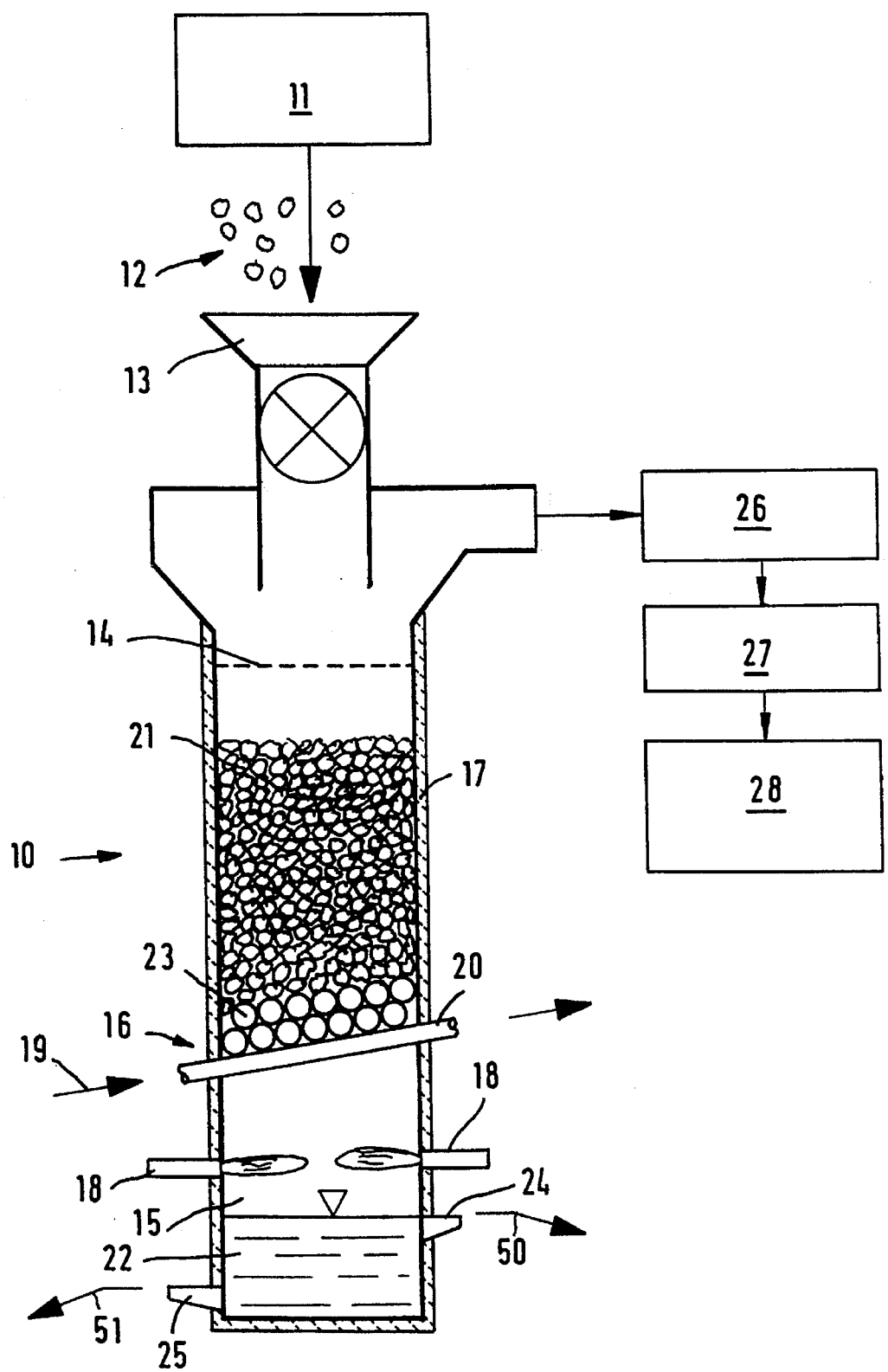

United States Patent
Gross et al.

[11] Patent Number: 5,605,104
[45] Date of Patent: Feb. 25, 1997

[54] METHOD AND DEVICE FOR MELTING DOWN SOLID COMBUSTION RESIDUES

[75] Inventors: Gerhard Gross, Willich; Frank Lichtmann, Gummersbach, both of Germany

[73] Assignee: Messer Griesheim GmbH, Germany

[21] Appl. No.: 337,980

[22] Filed: Nov. 14, 1994

[30] Foreign Application Priority Data

Nov. 22, 1993 [DE] Germany ......................... 43 39 675.5

[51] Int. Cl.⁶ ..................... F23G 5/00; F23G 5/10
[52] U.S. Cl. ..................... 110/346; 110/248; 110/259; 110/165 A
[58] Field of Search ..................... 110/248, 259, 110/346, 165 A, 266; 423/176, 442; 432/128, 146, 163

[56] References Cited

U.S. PATENT DOCUMENTS

| | | | |
|---|---|---|---|
| 4,191,114 | 3/1980 | Saitoh et al. | 110/248 |
| 4,720,295 | 1/1988 | Bronshtein | 65/2 |
| 4,877,449 | 10/1989 | Khinkis. | |
| 4,969,940 | 11/1990 | Schwarb et al. | 65/8 |
| 4,998,486 | 3/1991 | Dighe et al. | 110/346 |
| 5,078,065 | 1/1992 | Tsunemi et al. | 110/259 |
| 5,081,940 | 1/1992 | Motomura et al. | 110/259 X |
| 5,107,517 | 4/1992 | Lauren | 373/18 |
| 5,294,243 | 3/1994 | Taft et al. | 75/376 |

FOREIGN PATENT DOCUMENTS

| | | |
|---|---|---|
| 2137497 | 7/1971 | Germany. |
| WO88/06572 | 9/1988 | WIPO. |
| WO88/098411 | 11/1988 | WIPO. |

*Primary Examiner*—Henry A. Bennett
*Assistant Examiner*—Susanne C. Tinker
*Attorney, Agent, or Firm*—Connolly & Hutz

[57] ABSTRACT

The invention relates to a method and a device for melting down solid combustion residues such as slags, ashes and fine dusts from waste combustion installations (11) with solid, liquid and/or gaseous fossil fuels in a melting device. In order to reduce the necessary energy by combusting fossil fuels, the supply of the combustion residues (12) from the waste combustion installation (11) takes place directly into the filling opening (13) of the melting device. The melting device is designed as a shaft furnace (10) with a furnace space (14, 15) with a refractory lining, the combustion residues (12) being melted down by means of a fuel/oxygen mixture or by means of a fuel/oxygen-air mixture which is introduced into the shaft furnace below the combustion residue fill (21).

12 Claims, 2 Drawing Sheets

METHOD AND DEVICE FOR MELTING DOWN SOLID COMBUSTION RESIDUES

BACKGROUND OF THE INVENTION

The invention relates to a method and a device for melting down solid combustion residues In the disposal of waste in combustion installations, ashes, slags and filter dusts arise which, as a result of the conventionally prevailing combustion temperatures of 850° to 1050° C., are present only in crystalline or in sintered form. These combustion residues contain heavy metals, salts and harmful organic substances so that almost exclusively dumping is available for disposal. Grate ashes and grate slags are at present stored on domestic refuse and mono-dumps unless they find use to a limited extent as low-grade building materials. Boiler ash and fine dusts have to be stored on special waste dumps. By the action of rainwater or groundwater, the heavy metals, salts or harmful organic substances are dissolved and can penetrate uncontrollably into the groundwater. Dump spaces becoming constantly scarcer on the one hand and the sharpening of legal provisions on the avoidance and utilization of combustion residues on the other hand require a significant improvement of their chemical and physical properties.

As a result of these problems, a large number of physical, chemical and thermal treatment methods, such as e.g. compaction methods, washing methods, building-material manufacturing methods, low-temperature methods and melting methods, have already been developed.

These previously known methods solve the problems described only incompletely, such as e.g. the physical and chemical methods, or necessitate high expenditure on apparatus and energy.

It is known that in general the melting methods bring about the most lasting improvements of the properties of the combustion residues. As a result of the transfer of the combustion residues of the waste combustion installations into the molten phase, harmful inorganic substances are either bound in a leach-proof manner into a glass matrix or removed from the melt. Harmful organic substances are completely destroyed as a result of the high temperatures of 1300° to 1500° C.

A previously known melting method is based on the melting-down of the combustion residues from waste combustion installations in a melting tank heated with fossil energy.

In this connection, it is necessary beforehand to remove the ferruginous metal scrap completely from the hot combustion residue in order to avoid damage to the refractory lining of the melting tank. The costly magnetic separation of the ferruginous metal scrap allows, for technical reasons, a maximum temperature of only approximately 300° C. The cooling of the combustion residues necessary as a result in the wet slag-remover causes an approximately 30% greater energy consumption during melting-down.

The melting-down of hot ferruginous combustion residues is in principle possible with an electric arc or plasma melting method using valuable electrical energy and with a greater portion of energy costs per ton.

On the other hand, economical primary energies are used in the melting methods with fossil energy. For reasons of energy saving, the melting-down of the combustion residues in the hot state directly after the combustion in waste combustion installations would also be desirable in melting methods with fossil energy.

SUMMARY OF INVENTION

The aim of the invention is therefore to produce a method operated with fossil fuels and a device for melting down solid combustion residues, with which an energy saving can be achieved without high expenditure on apparatus.

By means of the invention, the energy balance during melting-down of combustion residues from waste combustion installations is improved because the hot unprepared combustion residues are preferably supplied directly via a feeding device to the filling opening of a shaft furnace. At the same time, the disadvantage of damage to the refractory lining is minimized because the melt is collected in a definitely fixed region of the shaft furnace, namely in the lower furnace, which can be repaired economically because the lower furnace of the shaft furnace is already designed for the repair of damage to the refractory material.

The separation of the hot unprepared combustion residues from the melt situated in the lower furnace is achieved by a water-cooled grate which is situated in the shaft furnace and on which the fill consisting of the combustion residues rests.

Figure 2:
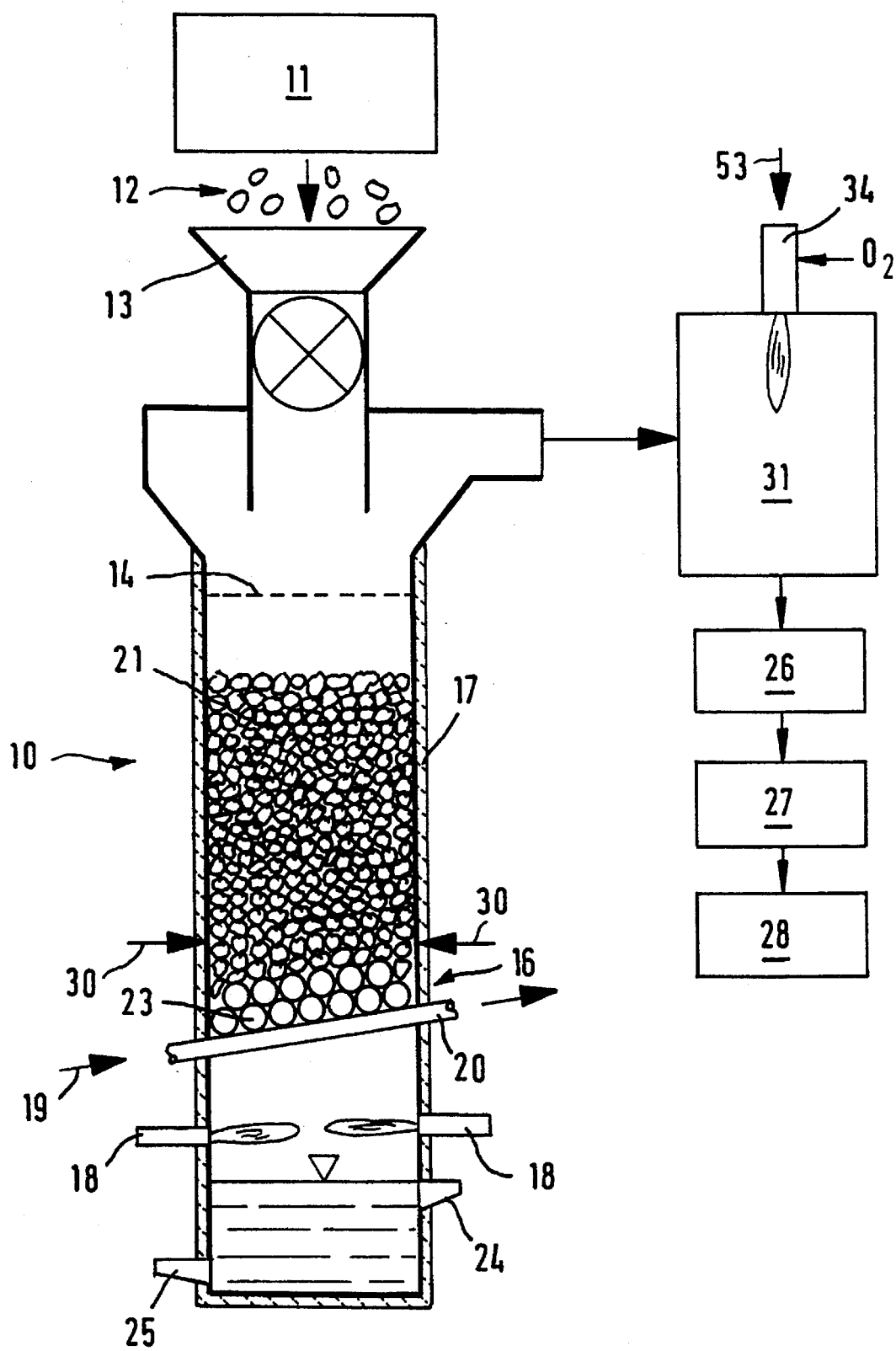

An exemplary embodiment of the invention is described in greater detail below and is illustrated in the drawing, in which FIG. 1 shows a shaft furnace according to the invention for melting down solid combustion residues with a fuel/oxygen-air burner;

FIG. 2 shows a shaft furnace according to the invention for melting down solid combustion residues and solid fuels with a fuel/oxygen-air burner and $O_2$ injection lances.

In the shaft furnace 10 illustrated in FIG. 1, the solid combustion residues arising in the waste combustion installation 11, such as slags, ashes and fine dusts, are charged preferably in the hot unprepared state, i.e. without comminution and metal separation, directly via the filling opening 13. A supply of the combustion residues in the cold as well as in the wet cold state is of course likewise possible. The shaft furnace 10 is divided into an upper furnace 14 and a lower furnace 15 with an intermediate grate 16. The cylindrical, vertically standing tube of the shaft furnace, which is lined with refractory material 17, is equipped with a fuel/oxygen burner or a fuel/oxygen-air burner 18 below the grate 16. The combustion of the hot unprepared combustion residues takes place on the grate 16 which consists of water-cooled pipes arranged parallel at an angle of approximately 5° to the horizontal. The cooling water 19 passes through the pipes 20 as a circulating flow or continuous flow. By means of this grate 16, a spatial separation is achieved between the combustion residue fill 21 and the melt 22 situated in the lower furnace 15.

Situated directly on the grate 16 are one or more layers of refractory, wear-resistant ceramic balls 23 which prevent the uncombusted combustion residues 12 falling through into the melt 22. The melt, which is created during the heating, heating-up, melting or the like of the combustion residue fill 21, flows through the interspaces of the balls 23 and the water-cooled pipes 20 and is collected in the lower furnace 15. As a result of the density differences between the mineral and metallic melt, separation takes place, the mineral melt 50 being drawn off from the shaft furnace continuously at the top via a channel 24 and the metallic melt 51 continuously at the bottom via a channel 25. The mineral melt is subsequently supplied to further processing stages, e.g. granulation or spinning.

Arranged symmetrically below the water-cooled grate 16 are burners 18 which are operated with gaseous or liquid fossil fuels. Oxygen-enriched air or technically pure oxygen in a concentration between 30% vol. $O_2<O_2<100\%$ vol. is used as oxidation medium.

By combusting the fossil fuels with oxygen or oxygen-enriched air, the energy for melting down the combustion residues is introduced into the shaft furnace 10. The hot combustion gases flow from below through the water-cooled grate 16 and are distributed into the combustion residue fill 21 uniformly over the shaft cross-section by the ball fill. As a result of this principle of direct counterflow heat exchange, the combustion residues in the lower part of the combustion residue fill 21 are melted. In the upper part, as a result of the direct cooling of the gases to close to the entrance temperature of the combustion residues, an optimum energy utilization takes place.

The combustion waste gases are quenched in a quenching arrangement 26 after leaving the upper furnace 14. The highly volatile and condensable waste gas components are separated in a fabric filter 27. The waste gases thus pre-cleaned are supplied to the smoke gas cleaning installation 28 of the waste combustion installation 11.

As a result of the use of oxygen-enriched air or oxygen as oxidation medium, the waste gas quantity of the shaft furnace 10 is very small. In the case of use of pure oxygen, this is only approximately 3% at most of the waste gas quantity of the waste combustion installation 11. To produce the oxygen, a VSA (Vacuum Swing Adsorption) installation is used, which produces oxygen with a purity of 90 to 93%.

The specific energy requirement during melting in the shaft furnace 10 is, in the case of use of pure oxygen as oxidation medium with approximately 0.9 MHh/t combustion residue, approximately 30% lower than in the known melting method in a melting tank with fossil fuel. The specific oxygen requirement is in this case at most 200 m³/t combustion residues.

The wear arising of the refractory ceramic balls is advantageously compensated by adding new balls 23 to the combustion residues 12. On the water-cooled pipes 20, in the stationary operating state, a uniform slag skin is formed, which protects the pipes 20 against high thermal and mechanical stress and prevents premature cooling of the hot combustion gases.

As an alternative to the liquid or gaseous fuels, solid fuels, such as e.g. coke, can be used. The coke is added continuously in hot combustion residues 12. The coke/residue ratio corresponds to the energy expenditure which is required for melting down and superheating the shaft furnace with oxygen or oxygen-enriched air as oxidation medium. In addition to the fuel/oxygen burners 18 for igniting the combustion residue fill 21 below the water-cooled grate 16, oxygen injection lances are built in above the water-cooled grate. The oxidation medium is blown into the combustion residue fill 21 by means of the injection lances 30 at high speed between 0.4<M<2.5 above the balls 23.

As a result of the CO formation occurring in the case of use of solid fuels, the waste gas of the shaft furnace 10 is post-combusted with excess oxygen in a post-combustion chamber 31 with a burner 34. For heating up to 1200° C. and post-combustion of the uncombusted gases in the post-combustion chamber 31, fuel 53/$O_2$ burners 34 are used, which are operated with the necessary excess oxygen.

Fine-grained combustion residues, such as e.g. fine dust, are pelletized and added continuously to the solid coarse-grained combustion residues. The adsorbents arising in the smoke gas cleaning of waste combustion installations 11, such as activated carbon, activated coke and/or lime/coke mixtures, can likewise be disposed of with the shaft furnace 10 by mixing them with the solid combustion residues 12 and combusting them and melting them down in the shaft furnace 10.

The application of the method to the solid combustion residues provides an inert product which, as a result of its basalt-like composition and its leaching stability, serves as a replacement for natural raw materials. This product is achieved with considerably lower specific energy and investment costs than in the case of all previously known thermal combustion residue treatment methods.

I claim:

1. In a process to melt solid metal-containing combustion residues stemming from waste combustion installations fluid fossil fuels in a melting device, the improvement being in conveying the combustion residues stemming from the combustion installation into the filling opening of the melting device, providing the melting device as a shaft furnace with a fire-proof lined furnace chamber and with a water-cooled grate therein, on which there is at least one layer consisting of spheres made of a fireproof material, piling the combustion residues onto the grate, and by melting the combustion residues at temperature between 1300° C. and 1500° C. by means of a fuel-oxygen mixture in which the oxygen content of the oxidant amounts to 30% by volume<$O_2$<100% by volume and which is introduced into the shaft furnace below the combustion residue pile.

2. The process of claim 1 in which the fuel-oxygen mixture is a fuel-oxygen-air mixture.

3. The process according to claim 1 in which the fossil fuels are liquid.

4. The process according to claim 1 in which the fossil fuels are gaseous.

5. The process according to claim 1 in which there are a plurality of layers of spheres.

6. Process according to claim 1, in which the combustion residues are fed into the shaft furnace while they are hot.

7. Process according to claim 1, in which a Vacuum Swing Adsorption system is employed in order to generate oxygen with a purity ranging from 90% to 93%.

8. In a process to melt solid metal containing combustion residues stemming from waste combustion installations with solid fossil fuels in a melting device, the improvement being in feeding the combustion residues stemming from waste combustion installation into the filling opening of the melting device, providing the melting device as a shaft furnace with a fire-proof lined furnace chamber and with a water-cooled grate therein, on which there is at least one layer consisting of spheres made of a fireproof material, by piling the combustion residues onto the grate, and melting the combustion residues at temperatures between 1300° C. and 1500° C. by means of solid fuels mixed together with the combustion residues prior to placement into the shaft furnace as well as by means of oxygen in which the oxygen content of the oxidant amounts to 30% by volume<$O_2$<100% by volume and which is introduced into the shaft furnaces above the grate.

9. Process according to claim 8 in which the oxygen is part of an oxygen-air mixture.

10. Process according to claim 8 in which there are a plurality of layers of spheres.

11. Process according to claim 8 in which the combustion residues are fed into the shaft furnace while they are hot.

12. Process according to claim 8 in which a Vacuum Swing Adsorption system is employed in order to generate oxygen with a purity ranging from 90% to 93%.

* * * * *